United States Patent [19]
McMorran et al.

[11] Patent Number: 5,142,658
[45] Date of Patent: Aug. 25, 1992

[54] CONTAINER CHASSIS POSITIONING SYSTEM

[75] Inventors: Peter D. McMorran, Yorktown; Richard W. Samms, Newport News, both of Va.

[73] Assignee: Daniel H. Wagner Associates, Inc., Hampton, Va.

[21] Appl. No.: 779,517

[22] Filed: Oct. 18, 1991

[51] Int. Cl.⁵ .............................................. G06K 9/00
[52] U.S. Cl. ........................................ 382/1; 358/93; 358/107; 340/686; 340/687; 414/396; 414/401; 414/584; 364/424.01; 180/167; 180/168; 180/169
[58] Field of Search ...................... 358/8793, 103, 107, 358/108; 340/686, 687; 414/401, 396, 584; 364/424.01424.02; 180/167, 168, 169; 382/1, 48

[56] References Cited

U.S. PATENT DOCUMENTS

| | | | |
|---|---|---|---|
| 3,669,288 | 6/1972 | Young | 214/152 |
| 4,214,266 | 7/1980 | Myers | 358/108 |
| 4,216,538 | 8/1980 | Tomlinson | 367/89 |
| 4,462,045 | 7/1984 | Norris | 358/93 |
| 4,692,755 | 9/1987 | Hahn | 340/687 |
| 4,811,227 | 3/1989 | Wikstrom | 364/424.02 |

Primary Examiner—Jose L. Couso
Attorney, Agent, or Firm—Wallace J. Nelson

[57] ABSTRACT

A computer controlled signalling system to assist a driver in accurately positioning a truck chassis at a preprogrammed specific stop point in a loading/unloading lane adjacent to a dockside container crane to facilitate loading/unloading of containerized cargo by the crane and employing a light signal panel visible to the truck driver and having a series of vertically disposed lights thereon sequentially actuated by a computer. The vertical lights indicate to the driver the exact distance he is from, and when he reaches, the desired stop point. The computer is responsive to a video image received from a video camera disposed over the traffic lane and matches the image(s) received with a programmed image for locating, identifying and signalling the position of the truck.

8 Claims, 7 Drawing Sheets

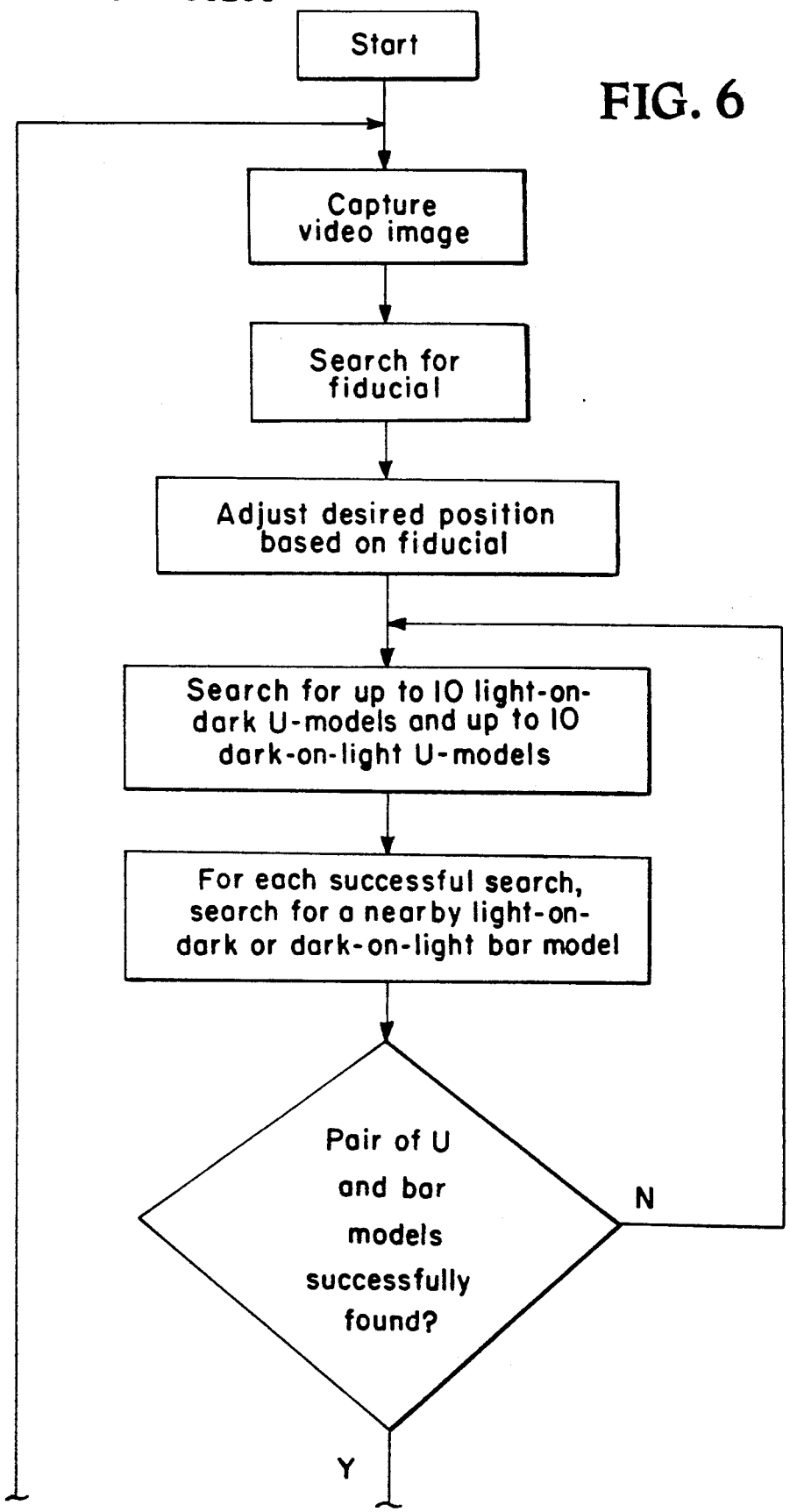

CONTAINER CHASSIS POSITIONING SYSTEM

FIELD OF THE INVENTION

This invention relates generally to signal systems and relates specifically to an automatic, computer controlled signalling system to assist a driver in accurately positioning a truck chassis at a specific location in a loading/unloading traffic lane.

BACKGROUND OF THE INVENTION

In the loading/unloading of container cargo between container transport trucks and container cargo ships, there can be a significant delay while the driver positions a truck chassis under the crane spreader. The hoist mechanism on dock side container cranes may be easily manipulated horizontally along the support booms but have very limited displacement on the longitudinal axis of the containers. Accordingly, it is essential that the truck chassis be accurately positioned to permit the container to mate with the pins and twist locks on the truck chassis or crane spreader. Presently, the positioning of the truck chassis is dependent on the driver skills in maneuvering his vehicle, his visual observations, and/or guidance by individual stevedores. Since the skill of drivers vary, there is no fixed time between positioning of the trucks and loading/unloading of the trucks. Accordingly, there is a definite need in the art for a system to systematically locate each truck chassis at a specific location relative to the container crane to minimize delay between loading/unloading container cargo between transport trucks and container ships.

It is therefore an object of the present invention to provide an automatic system to guide transport truck drivers to a specific point beneath a container crane.

Another object of the present invention is to provide a light signal system that indicates to the driver of a transport truck that he is approaching, and his relative distance from, the desired stop point in a loading/unloading traffic lane.

A further object of the present invention is to provide an automated signal light indication to the driver of a transport truck when to stop his truck in a loading/unloading traffic lane.

An additional object of the present invention is to provide a computer vision system that identifies the shape of an approaching truck chassis in a loading/unloading traffic lane and actuates a light signal visible to the truck driver to assist in accurately positioning the truck in the loading/unloading lane.

A still further object of the present invention is an overhead computer vision system to provide signals to a truck driver to assist in parking his vehicle in a desired location.

BRIEF DESCRIPTION OF THE INVENTION

According to the present invention the foregoing and additional objects are attained by providing an overhead video camera having long range capabilities and supported on a dock side crane frame. The video camera is angularly directed toward a loading/unloading traffic lane that passes beneath the crane frame. Container transport trucks travel along the loading/unloading traffic lane and are stopped underneath the crane with the longitudinal axis thereof disposed perpendicular to the support boom for the crane. Since the crane has very limited displacement capability along the longitudinal axis of the truck, it is essential that the transport truck be stopped where the crane spreader is disposed over the truck chassis in position to allow the container to mate with the pins and twist locks on the chassis or crane spreader.

The video camera captures an image of specific areas of the moving truck. These images are transmitted to a computer where a computer vision system converts the images into template images and compares the captured images with a series of sample template images to identify the truck part that is to be stopped at the desired location along the loading/unloading lane. Once the truck image being searched for is located, a signal light system, visible to the truck driver and actuated by the computer, indicates to the driver his relative location on the loading/unloading lane to the target stop point. As the stop point is approached, the signal light system indicates to the driver the exact stop point for his vehicle. After loading/unloading of the container transport truck, a longshoreman or stevedore at the site, signals the truck driver to proceed on his journey.

BRIEF DESCRIPTION OF THE DRAWINGS

A more complete appreciation of the invention and many of the attendant advantages thereof will be more readily appreciated as the same becomes better understood by reference to the following detailed description when considered in connection with the accompanying drawings wherein:

FIGS. 6-6A show a flow chart of the specific example of the vision imaging process according to the present invention.

DETAILED DESCRIPTION

Figure 1:
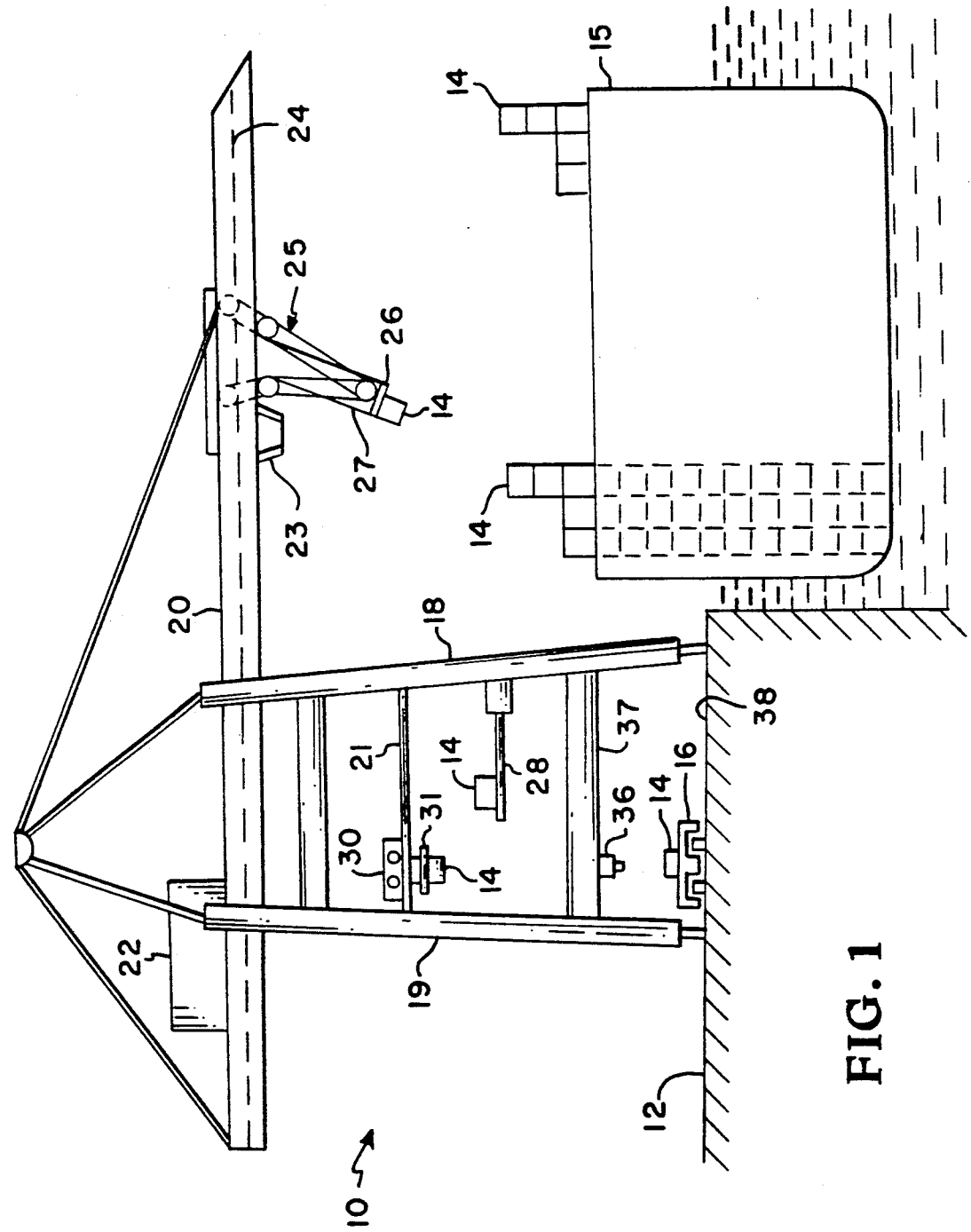
FIG. 1 is a partial view of an exemplary dock side container crane utilizing the present invention.

Referring now to the drawings and more particularly to FIG. 1, there is shown a schematic side view of an exemplary crane assembly incorporating the present invention, and designated generally by reference numeral 10. Crane 10 is disposed on a fixed pier, or dock 12 and adapted to transfer containers of cargo between a container ship 15 and container transport truck(s) or chassis 16 during a loading/unloading operation. The tractor or hustler for moving chassis 16 has been removed from this FIG. for the sake of illustration, however as used herein, the term truck, chassis or truck chassis is intended to include the hustler and the chassis pulled by the hustler. Crane 10 is provided with vertical supporting structures partially visible in this FIG. and designated by reference numerals 18 and 19. Vertical support structures 18,19 serve to support horizontal arms, or girders 20 and 21. Suitable wheels (not designated) are provided at the base of vertical support structures 18,19 to permit unrestricted crane gantry about dock 12. Alternatively, the wheels of crane 10 may be disposed on tracks (not shown) to restrict movement of crane 10 along the track, in a conventional manner. A wheeled carriage or trolley 23 is movable along a track 24 disposed on horizontal arm 20 of crane 10. The electrically operated crane motor and the main control room for crane 10 are disposed on girder 20 and housed within housing 22, as will be further explained hereinafter.

During operation, the crane operator rides in the cab of trolley 23 and maintains visual contact with hoisting device 25. Hoisting device 25 includes a spreader mechanism 26 that attaches, via grabbers or arms to all four corners of an individual freight container 14. Containers 14 are each essentially eight feet wide and of various lengths and the present invention can be programmed for any size container. The vertical position of spreader mechanism 26 is controlled by a series of crossing cables or ropes, some of which are shown in FIG. 1 and designated by reference numeral 27. Ropes 27 pass through blocks on trolley 23 and connect with suitable winches (not shown).

In a loading operation of ship 15, the crane operator in trolley 23 picks up a container 14 directly from container transport chassis 16 or one that has been previously positioned on platform 28. When employing separate platform 28 on crane 10, a separate hoist mechanism 30, including spreader 31, is also employed to first remove individual containers 14 from truck(s) 16 onto crane platform 28 and then each container is lifted from platform 28 to its destination on board ship 15. These two steps are carried out by two entirely different hoist mechanism 25,30 and under the supervision of two different operators.

When loading/unloading ship 15 directly to/from the container transport trucks 16, as well as when loading/unloading containers between trucks 16 and platform 28, there can be a significant delay while the driver positions the next truck chassis under the hoist spreader. Each hoist mechanism 25,30 is relatively easily adjusted along the length of their respective horizontal support booms 20,21. However, they have very limited displacement capability along the longitudinal axis of containers 14. Accordingly, the truck chassis 16 must be accurately positioned, or stopped, on loading/unloading lane 38 to permit the container 14 to mate with the pins and twist locks on the chassis 16 or spreaders 26,31.

The system for accurately positioning each chassis 16 includes a video camera 36 mounted on a beam 37 of crane 10. Camera 36, in the illustrated embodiment, is secured at a substantially ninety degree angle (from horizontal) on beam 37 and directed to view the back portion of truck(s) 16 that pass beneath crane 10 along loading/unloading traffic lane 38. Video camera 36 may be disposed at other angles for viewing other specific identifiable areas of truck(s) 16 and/or containers 14 as they pass beneath crane 10, if so desired. Video camera 36 is connected to a special purpose computer housed in housing 22, and under the control of an operator at the base of crane 10, or by the crane operator, as will be more thoroughly explained hereinafter.

Figure 2:
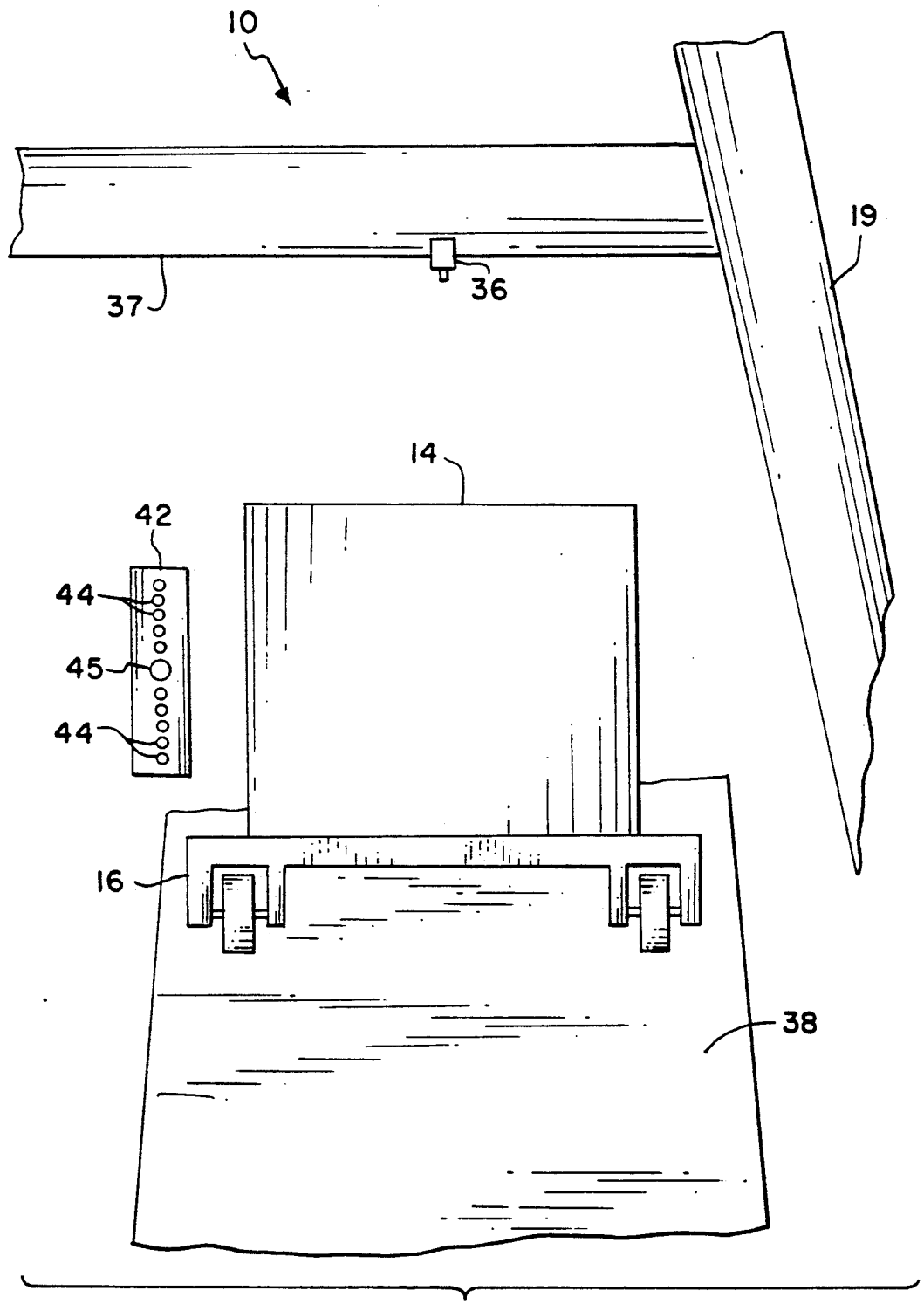
FIG. 2 is a part schematic view of the light signal panel of the present invention as viewed by a driver of the transport truck shown proceeding along a loading-/unloading lane beneath the crane shown in FIG. 1.

Referring now more particularly to FIG. 2, a part schematic view of the light signal panel 42, as viewed by the driver of a truck chassis 16, is shown. This FIG. is taken looking in the same direction as that shown in FIG. 1. As shown therein, truck 16 travels along loading/unloading traffic lane 38 beneath crane 10 and the truck driver observes and reacts to lights 44,45 on light signal panel 42. A separate light signal panel 42 normally would be provided for each traffic lane that extends beneath crane 10, although one panel could be disposed between adjacent lanes and, selectively, serve either lane. Light signal panel 42 may be mounted along side of each traffic lane, on one of the crane vertical support legs, or suspended from an overhead portal beam of crane 10. It is only essential that light signal panel 42 be located such that all lights are in view for the driver in all positions under crane 10 and that the entire panel 42 be clear from any interaction of the crane spreader(s).

The signal lights on panel 42 consist of a vertical column of eleven lights consisting of ten small white lights 44 divided, into two columns of five each, by a center amber light 45. Lights 44 and 45 are computer actuated in response to the images received by video camera 36, as will be further explained hereinafter. Lights 44 give visual indication of the distance truck 16 is from the necessary stopping point and are arranged to determine the distance offset from the stopping point according to a nonlinear scale. In the preferred and illustrated embodiment of the present invention, this nonlinear scale is 1, 4.5, 10, 22, and 48 inches. Once panel 42 is actuated, by an operator on the ground or by the crane operator, and while truck 16 is more than 48 inches from the desired stop point, all white lights 44 are off and amber light 45 begins flashing. The nonlinear scale allows a wide range (eight feet total), while facilitating fine positioning over the middle of the scale.

As chassis 16 is approaching or behind the desired location or stop point, the bottom light on panel 42 represents the longest distance, with lights 44 illuminating from the bottom as the chassis moves forward. When chassis 16 is beyond the desired location or stop point, the top light on panel 44 represents the longest distance, and would be the last light to illuminate as truck 16 exist from the stop point. Once a chassis 16 is detected by the camera/computer, that is, the driver comes within 48 inches of the target stopping point, the lowest or bottom white light 44 in the column is illuminated. As the truck 16 comes with 22 inches of the stopping point, the second lowest white light 44 illuminates and the previously lighted bottom light 44 is extinguished.

This procedure proceeds until the driver is within 2.25 inches of the optimal stopping point. At that time, amber light 45 stops flashing and remains on. The white light 44 immediately below amber light 45 is extinguished when truck 16 moves to a position within one inch of the stopping point. When the driver moves vehicle 16 one inch beyond the stopping point the closest light 44 above amber light 45 is illuminated. The remaining white lights above amber light 45 function in the same sequence as those below, but in a reverse order. That is, the first light to turn on is the white light 44 directly above amber light 45. Amber light 45 begins flashing again when truck 16 is moved 2.25 inches beyond the stopping point. The first white light 44 above amber light 45 turns off when truck 16 is 4.5 inches beyond the stopping point and the next light 44 is in the column is illuminated. Once truck 16 is 48 inches beyond the stopping point, the top white light 44 is turned off and flashing amber light 45 is the only light on panel 42 that remains on.

Thus, the computer/vision system readily controls the lights on panel 42, based on the detected position of chassis 16 relative to the desired stop point. The process of evaluating the desired light configuration is intuitively understood and easily implemented when explained to semi-skilled labor. The computer controlled lamp actuators for the lights on signal panel 42 are readily available state-of-the-art items and are automatically operated by the computer.

Figure 3:
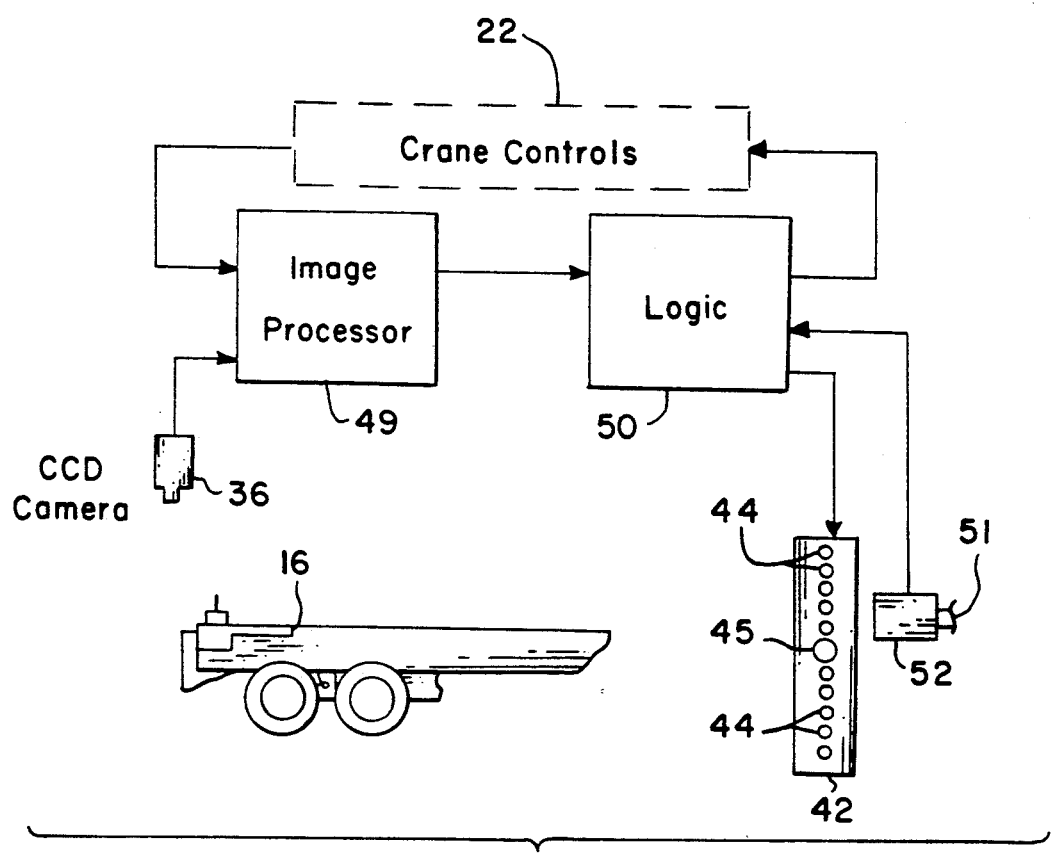
FIG. 3 is a diagrammatic representation of the component parts of the present invention.

Referring now to FIG. 3, a schematic representation of the component parts of the computer-vision system of the present invention is shown. The system consists of four logical components including (1) chassis position determination, (2) vision imaging, (3) control and display and (4) driver signaling. The chassis 16 position is determined by viewing with camera 36. The image received by camera 36 is processed by image processor mechanism 49, with the processed image(s) being analyzed and converted to driver signals by computer logic mechanism 50 and transferred to signal light panel 42 visible to the driver of truck chassis 16. The logic mechanism also transfers appropriate signals to the crane controls in crane control room 22. A suitable control switch or button 51, on support fixture 52, is in communication with logic mechanism 50 and serves as a manual actuator to disable a specific traffic lane and its light display panel, when the need arises. Push button 51 may be physically located at ground level and manually operated by a stevedore at the site or in the crane cab and operated by the crane operator. Conventional coaxial cable and multi-conductive electrical cables (not illustrated) extend along the crane support surfaces and connect camera 36, image processor 49, logic circuitry 50, control room 22, switch 51 and the light display panel 42, in a conventional manner.

An exemplary camera 36 that may be employed in practice of the present invention is a standard monochrome closed-circuit television camera with a 16 mm (wide angle) lens. A suitable weather proof housing is provided for, and mounted with, camera 36 on crane portal beam 37 above the loading/unloading lane to be monitored. In this location, camera 36 is approximately thirty-five feet above the truck chassis 16 being monitored. The lens focal length is selected to allow a complete view of the back of any chassis from 20 to 45 feet long. In an actual test a Panasonic WV-CD52 camera containing a charge-coupled device (CCD) sensor with indicated resolution of 510 pixels (h) by 429 pixel (v) was employed. Actual resolution in the video output signal from this camera is about 380 (h) by 350 (v).

The vision processor employed in practice of the embodiment of the present invention described herein was a Cognex 3400, manufactured by Cognex Corporation, Needham, MA. This processor system contains a Motorola MC68020 microprocessor running at 25 MHz and a VC-1 Vision Co-Processor designed by Cognex. Also included in this processor is an image digitizer that accepts standard RS-170 television signals and stores them in digital form in a 1024×512 byte frame memory. The system includes 8 MB of dynamic RAM, which stores Cognex software, developer software, copies of images and other related data during operation. The system also has three RS-232C serial ports for communication with a host computer and for control of other equipment. The processor is mounted in a Cognex VB1 enclosure which includes an 800 MB3.5" floppy disk drive and interfacing for OPTO-22 control modules.

Cognex provides an extensive library of functions for use with their products. In the present invention functions in the areas of (1) image acquisition, (2) image processing, (3) training and (4) searching are involved.

Image acquisition allows the program to capture one complete video frame into the frame buffer as a scene for processing, while image processing functions allow definition of windows into the image. Processing can than be performed on data in the window instead of the frame buffer image. Other functions allow copying, sampling and averaging of data in windows or in the entire image. Training creates and saves a model of an object in the form of grey scale values taken from a window on the image. Searching finds the region of an image that is best correlated with the features of the given model and generates a score value indicating how well the image agreed with the model, as well as a position representing the location of the model center found in the image. One or more possible locations can be found each having a different score and center.

Figure 6A:
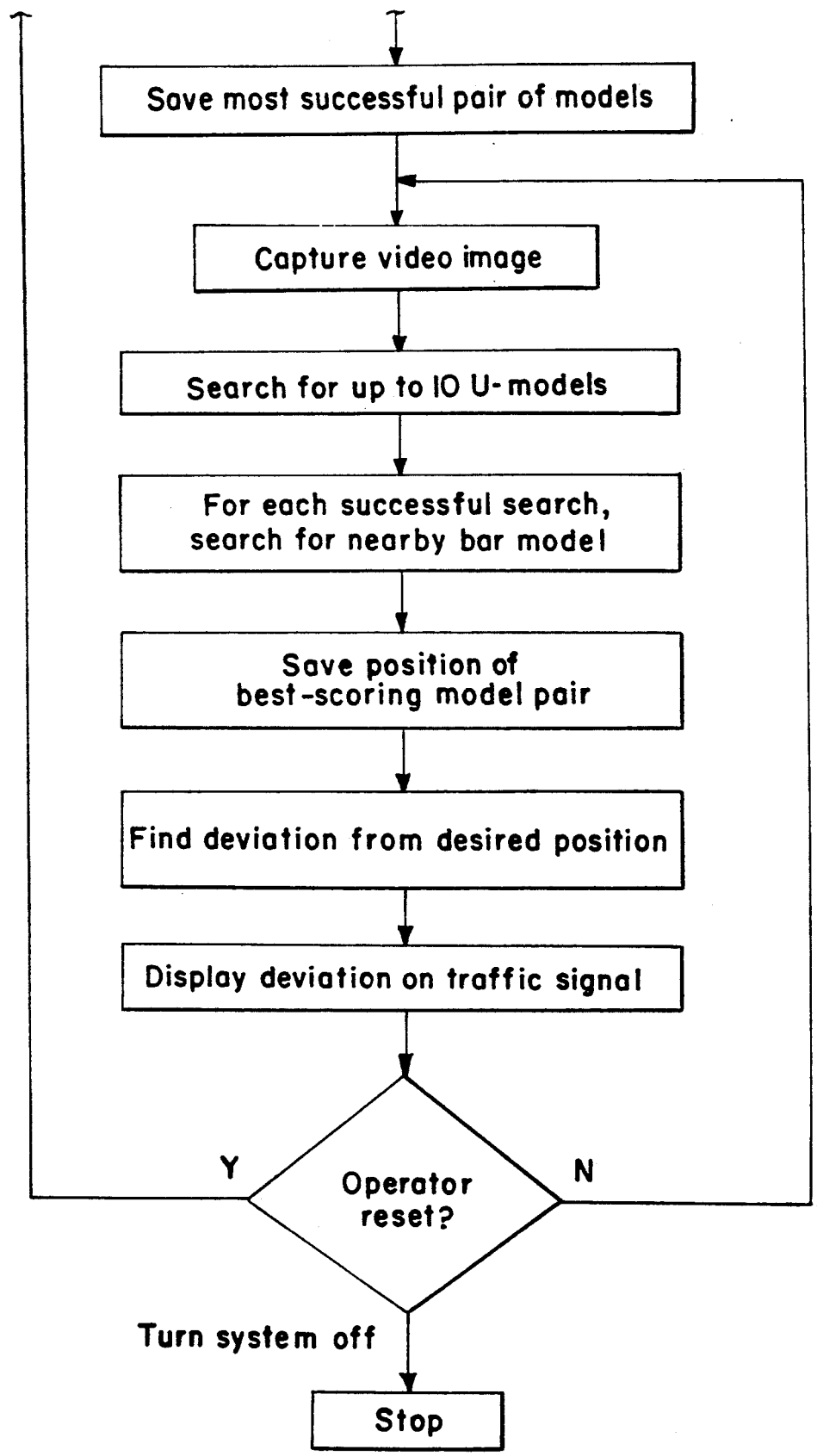

The algorithms implemented for chassis tracking in the present invention are divided into several components. FIGS. 6-6A show a flow chart of the vision imaging process for the algorithm described hereinbelow that is embedded within the Cognex image processing software.

During the "training" function a chassis positioned at the desired stop point is recognized and its location is defined as the desired position with the chassis model and position information being saved for on-line execution. The on-line main loop of the computer first finds a chassis then tracks it until the computer operator resets the program to find a new chassis.

In training, the operator selects an object, attached to or part of crane 10, in the field of the camera view as a reference point or fiducial. All calculations are done in numbers of pixels, relative to the position of the fiducial, to allow the program to account for possible movement of the camera. The operator positions a window over the fiducial and the program trains on it and, with a somewhat larger window to be used in searching for the fiducial being saved in memory, the program verifies that the fiducial can be found within this window. A separate window will be created for the camera monitoring each loading/unloading traffic lane under crane 10.

Models are created to represent the chassis by training on the resulting image or internally within the computer. Grey scale and binary models are created by positioning a window and training the resulting image while the mathematical models are trained internally.

In operation, the main computer program begins by locating the fiducial and tracking it until it stops any movement caused by camera vibrations or the like. The program then corrects the desired chassis position based on the fiducial and moves the fiducial search window to current fiducial position to account for any possible slow drift in relative position of the fiducial and camera.

The program next locates a chassis, tracks it and displays the offset from the desired position on light signal panel 42. When the operator pushes a specific push button, the program returns to the beginning of the loop, to locate a new chassis. A copy of the program and data in memory is saved to the vision system floppy disk after training for subsequent restart.

The "find" process searches the user-defined window for a chassis. The search method and acceptance criteria depend on the specific tracker being run. The top signal light on panel 42 is initially on, and it goes off when a chassis is located. "Find" returns when a chassis has been located.

The "track" process continues locating the chassis by searching the user-specified window for possible targets. The offset from the desired position is computed from the location of the target having the best shape score. Each track computing cycle takes between 100 and 200 ms on the Cognex 3400, so the update rate is about five times per second.

The image is stored in memory as 576(h) by 448(v) eight-bit pixels. Each pixel represents about 0.75 inches. The grey-scale search method used can interpolate between pixels, so accuracy of better than 0.5 inches is possible. The factor relating inches to pixels can be calibrated at any time in a conventional manner.

The tracker used in the specific embodiment of the present invention deals with the fact that chassis sometimes appear lighter than the pavement, and sometimes darker, depending on lighting conditions and chassis color. In this embodiment, only the mathematical corner models and the inverted U-synthetic models are employed as a template for locating the chassis. These models are created with both light with dark background (normal) and dark with light background (inverted). The algorithm chooses the highest-scoring combination of the two targets. Chassis enter from the top of the image, so this favors a match near the back of the chassis, other things being equal.

As stated hereinabove, FIGS. 6–6A illustrate a flow chart of the above described algorithm to be embedded within the Cognex image processing software.

Figure 4:
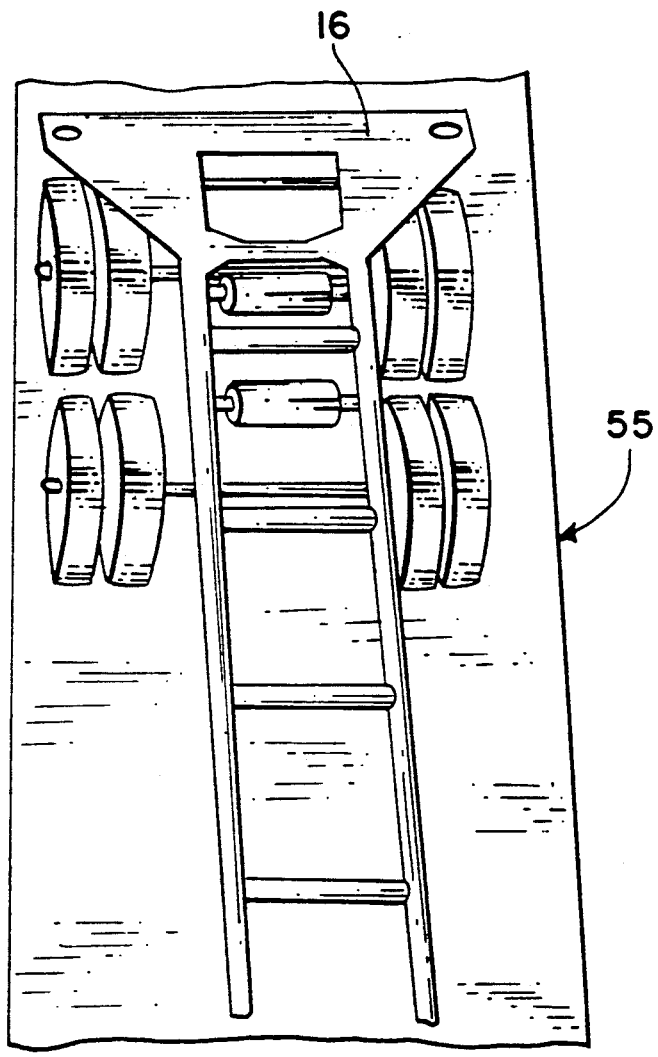
FIG. 4 is an overhead view of an exemplary container truck chassis as seen by the video camera employed in the computer vision system of the present invention.

In an actual embodiment of the present invention a camera image of an unloaded chassis 16 is illustrated in FIG. 4 and designated by reference numeral 55. As shown therein this is a light image with dark background.

Figure 5:
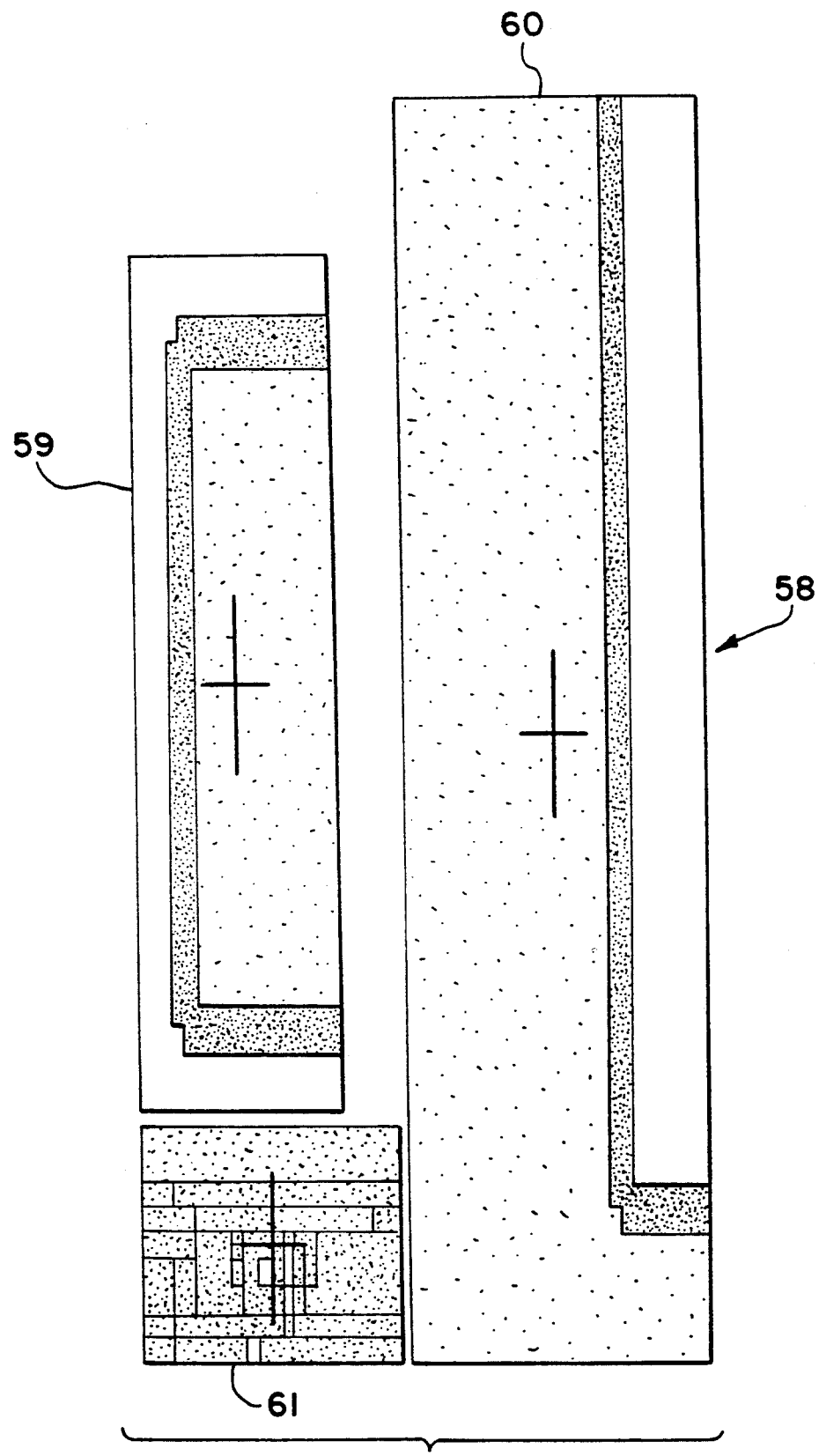
FIG. 5 is a view of the template employed in the computer vision system of the present invention to represent the rear view of the truck chassis shown in FIG. 4.

An actual computer image or template for this specific chassis is illustrated in FIG. 5 and designated generally by reference numeral 58. Template 58 includes a U-configuration 59 representing the rear of chassis 16, and a corner section 60, representing the square corners of chassis 16 and disposed directly in front of the end portion. The reference fiducial 61 appears in the lower left corner of FIG. 5.

Since chassis 16 come in various configurations, different templates for each possible chassis configuration (possibly as many as ten) would be employed in computer memory and searched during the identification and location of chassis 16 described hereinbefore. Once a chassis 16 has been identified, it moves by relatively small amounts from frame to frame to reduce the search area required by camera 36.

Other suitable template groups would be employed for use when positioning a loaded chassis with the templates representing suitable predetermined patterns of the containers that would be visible to camera 36. Since the top of a container is a rectangle with sharply defined corners, the vision system can be easily programmed to recognize these corners. The potential error that may be introduced by varying height chassis and containers can be easily corrected by comparing the observed container dimensions with the standardized length and width programmed.

Other errors can be avoided by simplifying the problem. For example, to avoid confusing signals, normally the system of the present invention would be disabled for all traffic lanes not in use for the loading/unloading operation underway.

Response time is a critical aspect of the present invention. Ideally, the system acts so fast that the operator feels that the lights directly reflect actual chassis position. If the response were too slow, the resulting delay could cause the driver to move back and forth over the target location, wasting valuable time. Because of the nonlinear spacing of lights 44 on panel 42, this should be a consideration only during fine positioning or when the chassis is moving relatively slowly.

Although the invention has been described relative to specific embodiments thereof and relative to a specific crane system, it is not so limited and there are numerous variations and modifications of the invention that will be readily apparent to those skilled in the art in the light of the above teachings. It is therefore to be understood that, within the scope of the appended claims, the invention may be practiced other than as specifically described herein.

What is claimed as new and desired to be secured by Letters Patent of the United States is:

1. An automatic, computer controlled signalling system to assist a driver in accurately positioning a truck chassis at a preprogrammed specific stop point in a loading/unloading lane adjacent to a dock side container crane to facilitate loading/unloading of containerized cargo comprising, in combination:

a dock side crane for loading/unloading containerized cargo between a ship and container transport trucks;
   at least one loading/unloading lane extending beneath at least portions of said crane for passage of container transport truck vehicles thereon;
   signal means adjacent to and visible to a driver of a truck moving along said at least one loading/unloading lane;
   means for capturing an image of specific parts of a truck moving along said at least one loading/unloading lane;
   computer vision means for receiving and comparing the captured image to a series of sample images to identify and match the captured image with one of said series of sample images;
   said signal means being in connection with and being responsive to said means for receiving and comparing the captured image, whereby
   when said means for capturing an image of a specific part of a moving truck matches the captured image with one of said series of sample images, said signal means will visually indicate to the driver of the truck that he is approaching the desired loading/unloading stop point and indicate the relative distance his vehicle is from the desired loading/unloading stop point, and when his vehicle reaches the desired loading/unloading stop point the signal means will indicate that he is to stop his truck for the loading/unloading thereof by said crane.

2. The computer controlled signalling system of claim 1 wherein said signal means includes a light signal panel;

said light signal panel having a column of spaced vertical lights thereon;
   said column of spaced vertical lights being responsive to said computer vision means and including a first series of vertically disposed white lights, a center amber light, and a second series of vertically disposed white lights;
   said first series of vertically disposed white lights being sequentially illuminated by said computer vision means when a container transport truck enters within a predetermined distance from the desired loading/unloading stop point;

said center amber light being programmed to flash while a container transport truck approaches and exits from the stop point and to continuously burn while a container transport truck is stopped at the loading/unloading stop point; and said second series of vertically disposed white lights being sequentially illuminated by said computer vision means as a container truck is exiting from the loading/unloading stop point.

3. The computer controlled signalling system of claim 1 wherein said signal means includes a light signal panel;

said light signal panel having a column of spaced vertical lights thereon;

said column of spaced vertical lights consisting of two columns of five white lights divided by a center amber light;

each column of five white lights adapted to be sequentially illuminated to give visual indication to the truck driver of the relative distance his vehicle is from the desired loading/unloading stop point.

4. The computer controlled signalling system of claim 3 wherein the sequential illumination of said column of spaced vertical lights is programmed to indicate, on a nonlinear scale, the distance the truck driver is from the loading/unloading stop point; said nonlinear scale being 1, 4.5, 10, 22 and 48 inches.

5. The computer controlled signalling system of claim 4 wherein each light in each column of white lights is programmed to be extinguished as the next light in the column is illuminated to ensure that only one white light in the column is illuminated at any given time.

6. The computer controlled signalling system of claim 1 wherein said computer vision means includes a video camera attached to a portion of the dock side container crane and angularly directed to view traffic moving along a loading/unloading lane under the crane.

7. The computer controlled signalling system of claim 6 including a computer having a memory capability and serving to receive pictorial images from said video camera and convert the pictorial images received to digital images; and means for identifying, comparing and matching the digital images to one of a series of known images stored in the memory of said computer.

8. A method of assisting a driver in accurately positioning a container transport vehicle at a preprogrammed specific stop point in a loading/unloading lane adjacent to a dock side container crane to facilitate loading/unloading of containerized cargo, comprising the steps of:

providing a dock side crane for loading/unloading containerized cargo between a ship and a container transport vehicle;

providing a loading/unloading traffic lane extending beneath at least portions of the crane for passage of container transport vehicles thereon;

providing signal means adjacent to and visible to a driver of a container transport vehicle moving along the loading/unloading lane;

providing a video camera directed toward the loading/unloading traffic lane to capture an image of any vehicle within the camera range moving along the traffic lane;

providing computer vision means for receiving and comparing the captured image to a series of sample images to identify and match the captured image with one of the series of sample images; and, when a match image is received, converting this information to a digital signal and transferring this information to the signal means to illuminate a light thereon that indicates to the driver of the container transport vehicle the relative position he is from the desired loading/unloading stop point.

* * * * *